United States Patent Office 3,014,940
Patented Dec. 26, 1961

3,014,940
PROCESS FOR THE PREPARATION OF METAL DITHIOPHOSPHATES
Charles S. Lynch, Plainfield, William E. Lifson, Union, and Richard F. Finn, Cranford, N.J., assignors to Esso Research and Engineering Company, a corporation of Delaware
No Drawing. Filed Nov. 2, 1959, Ser. No. 850,095
9 Claims. (Cl. 260—429)

This invention relates to an improved process for the preparation of lubricating oil additives. More particularly, the present invention relates to an improved process for the preparation of the metal salts of dialkyl dithiophosphoric acids which comprises reacting an aliphatic alcohol with phosphorus pentasulfide containing less than 27.6 wt. percent phosphorus to form a dialkyl dithiophosphoric acid and neutralizing said acid to form the metal salt.

The metal salts of dialkyl dithiophosphoric acids are well known in the prior art as additives for lubricating oil compositions. This class of metal salts is particularly useful as antiwear and antioxidant additives for lubricating oils suitable for use in internal combustion engines. The metal salts of the dialkyl dithiophosphoric acids are normally prepared by reacting phosphorus pentasulfide with an alcohol or mixture of alcohols in a molar ratio of approximately four moles of the alcohol per mole of phosphorus pentasulfide to form a dialkyl dithiophosphoric acid. The acid is then normally neutralized in the prior art processes with a polyvalent metal oxide, hydroxide, or reactive polyvalent metal salt to form a metal dialkyl dithiophosphate useful as a lubricating oil additive. In the use of these prior art processes, certain disadvantages have been encountered. One of the primary disadvantages is the fact that the metal salts prepared by the above procedure are often unstable as regards hydrogen sulfide evolution and have been found to give high $H_2S$ demerit ratings upon blending with lubricating oils and particularly with lubricating oils prepared from sour crudes such as Panhandle. It has also been found that when the metal salts are prepared by these prior art processes, the amount of metal oxide or hydroxide required to obtain a neutral product is 20 to 50% in excess of stoichiometric, and extreme difficulty in filtering the final product is often encountered.

The improved process of the present invention overcomes these disadvantages and provides a means for formulating metal dialkyl dithiophosphates that (1) are highly stable as regards $H_2S$ evolution, (2) require less and close to stoichiometric amounts of neutralizing agent, and (3) have improved filterability. The improved process of this invention also affords a means of eliminating or reducing the time-consuming blowing of metal dithiophosphates with an inert gas such as nitrogen to improve their $H_2S$ stability. Further, the nitrogen blowing has not proven to be effective in permanently reducing $H_2S$ evolution of metal dithiophosphates where a high degree of $H_2S$ stability is required.

Other improvements obtained in the metal dithiophosphates by use of the process of this invention are lower neutralization numbers (ASTM D–974) and a more consistent product.

It has now been found, and this finding forms the basis of the present invention, that if the dialkyl dithiophosphoric acid is prepared with a phosphorus pentasulfide having a low phosphorus content, less metal oxide is required to neutralize the acid and further improved $H_2S$ stability and filterability are obtained in the resultant metal dithiophosphate. In the past, phosphorus pentasulfide containing 27.7 to 28.3 wt. percent phosphorus has generally been used in the preparation of metal dithiophosphates. The theoretical value for phosphorus pentasulfide is 27.9 wt. percent phosphorus. Thus, the phosphorus content of the phosphorus pentasulfide used in the prior art has been close to and often slightly higher than the theoretical. In the present invention the phosphorus pentasulfide will contain below 27.6 and preferably about 26.0 to 27.2 wt. percent phosphorus. Since the phosphorus pentasulfide employed in the present invention contains less than the theoretical amount of phosphorus, it might be more aptly described as a compound of phosphorus and sulfur containing less than 27.6 wt. percent phosphorus. For the sake of brevity, however, the phosphorus sulfur compounds useful in this invention will be referred to as phosphorus pentasulfide.

The process of the present invention may be employed in the preparation of metal dialkyl dithiophosphates wherein the metal is any polyvalent metal and preferably selected from the group consisting of alkaline earth metals, zinc, lead, cadmium, copper, cobalt, and nickel. Particularly preferred are those polyvalent metals selected from the group consisting of alkaline earth metals, zinc, cadmium, and lead.

The dialkyl dithiophosphoric acids useful in the process of the present invention have the following general formula:

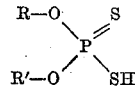

wherein R and R' may be the same or different alkyl groups containing 1 to 16 and preferably 3 to 13 carbon atoms per alkyl group.

The process of the present invention comprises reacting 4 moles of a $C_1$ to $C_{16}$ aliphatic alcohol with one mole of a phosphorus pentasulfide containing less than 27.6 wt. percent phosphorus at temperatures of 100° to 250° F. for a period in the range of 1 to 6 hours. Free sulfur may then be added in an amount ranging from 0.1 to 3.0 wt. percent, based on the total weight of the dithiophosphoric acid to further reduce the phosphorus-to-sulfur ratio. To the dithiophosphoric acid or the dithiophosphoric acid containing free sulfur is added ⅓ to 1 mole of a basic-reacting inorganic polyvalent metal compound, such as the oxide or hydroxide, and the temperature is raised to about 120° to 250° F. An excess 2 to 40% by weight of the metal oxide may be used but is not required where low phosphorus content phosphorus pentasulfide is employed. This reaction temperature is held for 2 to 12 hours or until the product is essentially neutralized. It should be understood, however, that the temperatures and particularly the time of reaction will vary according to the size of the reaction mixture, equivalents being used, etc. The product will usually be diluted with mineral oil or other suitable solvents to form a concentrate more easily handled than the pure additive. The concentrate will normally contain 25 to 95 wt. percent of the metal dithiophosphate additive.

In the present invention it has been found to be particularly advantageous to employ free sulfur addition to the dithiophosphoric acids prepared from the phosphorus pentasulfides containing about 27.6 wt. percent to about 27.2 wt. percent phosphorus. It appears that this free sulfur addition prior to neutralization is a successful alternate for obtaining substantially the same improved properties with the phosphorus pentasulfides of 27.6 to 27.2 wt. percent phosphorus, as are obtained with the preferred phosphorus pentasulfides of this invention, i.e., those containing 26.0 to 27.2 wt. percent phosphorus.

A preferred means of introducing the $P_2S_5$ into the reaction vessel is by slurrying the dry $P_2S_5$ with the alcohol or alcohols that are to be used in the process to form the dialkyl-oxy radicals of the dialkyl dithiophosphate. The slurry is preferably kept cold enough to minimize reaction of the $P_2S_5$ and alcohol prior to introduction into the reaction vessel. The metal oxide, hydroxide, etc., used to neutralize the dithiophosphoric acid may also be introduced into the reaction vessel by means of an alcohol slurry. Slurry concentrations of about 50% solids are generally used. Use of alcoholic slurry provides better control (over dry solids addition) and faster dispersion of the reactants in the reactor vessel.

It should also be understood that in the process of the present invention the free sulfur may be added any time prior to neutralization with the metal oxide, e.g., the free sulfur may be added to the alcohol prior to reaction with the $P_2S_5$ to form the dialkyl dithiophosphoric acid. It is preferred, however, to add the surfur after formation of the dithiophosphoric acid rather than directly to the alcohol.

Alternatively, the metal dithiophosphates may be prepared by neutralizing a mixture of the dithiophosphoric acid, or the dithiophosphoric acid containing the added free sulfur prepared above, with an alkali metal hydroxide and then adding a polyvalent inorganic metal salt such as zinc, lead, or cadmium nitrate to form the improved dialkyl dithiophosphates by double decomposition. Regardless of whether the metal dialkyl dithiophosphates are formed by simple reaction or by double decomposition, the use of a low-phosphorus-containing phosphorus pentasulfide and elemental sulfur prior to neutralization will still result in an $H_2S$ stable product having substantially theoretical sulfur-to-phosphorus and metal-to-phosphorus ratios and a higher filtration rate.

The following examples are submitted as further defining the process of this invention and the improved properties obtained by said process. These examples, however, are not intended to limit the invention in any way.

EXAMPLE I

A mixture of 260 grams isobutyl alcohol and 140 grams primary amyl alcohols was heated to 165° F. in a flask equipped with a mechanical stirrer and reflux condenser. While agitating the mixture at 165° F., 284 gms. $P_2S_5$ of 27.5 wt. percent phosphorus were added in about 1 hour. In 3 hours at 165° F. a yield of 608 gms. acid of 1.042 specific gravity was produced. Two neutralizations were made with this acid. (a) 297 grams of the acid and 1.4 grams sulfur were placed in a flask similar to the one used above. While stirring, 52.6 gms. ZnO (108% theoretical) were added in about 15 minutes. The heat of the reaction raised the temperature to about 160° F. It was held at this temperature for 3 hours before 59 gms. of hydrofined phenol extracted coastal distillate having a viscosity at 210° F. of about 40 SSU was added and the product filtered and dried at 210° F. (b) The same as (a) except that no sulfur was added. Both of these products gave zero demerit in the $H_2S$ demerit test with 5 wt. percent zinc dialkyl dithiophosphate (ZDDP). When, however, the test was made more severe by reducing the concentration of ZDDP in the blend from 5 wt. percent to 0.25 wt. percent, (a) gave a demerit of 0.5 while (b) gave a demerit of 4. It is an established fact that lesser amounts of some metal dithiophosphates have a greater tendency to liberate $H_2S$ in mineral oil than do higher concentrations.

The $H_2S$ demerit test is designed to measure the $H_2S$ stability of sulfur-containing additives in lubricating oils or conversely the $H_2S$ evolution of an additive in a lubricating oil base. The test consists of adding a known quantity of the zinc dialkyl dithiophosphates prepared above to a solvent extracted mid-continent mineral oil of 150 SSU viscosity at 100° F. The $H_2S$ evolution of the lubricant is measured by heating 87.5 gms. of the oil containing 5.0 wt. percent or 0.25 wt. percent of the additive for 1 hr. in a stoppered 4 oz. bottle. The stopper is then removed and a piece of wet lead acetate paper is placed over the lid for five minutes. Any $H_2S$ that is evolved will cause a darkened spot on the paper. The results are reported as demerits on the basis of the color of the spot. The demerit scale ranges from 0 to 5 with 0 being no spot and five a very dark spot. The test is made more severe either by decreasing the concentration of metal dithiophosphate in the oil or by the use of a base oil containing a higher concentration of lubricating oils derived from sour crudes, e.g., Panhandle.

To further illustrate the improved process of this invention, three groups of zinc dialkyl dithiophosphates were prepared according to the above process. In the first four preparations of Group I and the first two preparations of Group II, however, no free sulfur was added prior to neutralization. The two groups of additive preparations differed in that the preparation of Group I incorporated a $P_2S_5$ which was just within the maximum phosphorus content, while the preparations of Group II incorporated a $P_2S_5$ which was just within the preferred phosphorus content for the $P_2S_5$ reactant. Group III consisted of a single additive preparation illustrating the advantages of low phosphorus content phosphorus pentasulfide without free sulfur addition. The additive preparations of Groups I and II and III were tested for filterability and $H_2S$ stability. The results of these tests are given in Table I.

*Table I*

LABORATORY PREPARATIONS OF ZINC DIALKYL DITHIOPHOSPHATES [1]

| Additive Preparations | $P_2S_5$, Percent Phosphorus | Sulfur Added to— | | ZnO Used, Percent Theory | Filter Rate [4] Time, Min. | ZDDP Quality | | | | Wt. Percent Calculated to 8.0% Phosphorus | | |
|---|---|---|---|---|---|---|---|---|---|---|---|---|
| | | Alcohol [2] | DDPA [3] | | | $H_2S$ [5] | Appearance | Sulfur Crystallize Out | | Zinc | Phosphorus | Sulfur |
| Group I: | | | | | | | | | | | | |
| 1 | 27.56 | 0 | 0 | 106 | 20 | 2 | Clear | No | | 9.5 | 8.0 | 17.4 |
| 2 | 27.56 | 0 | 0 | 108 | 18 | 3 | ...do | No | | 9.7 | 8.0 | 17.6 |
| 3 | 27.56 | 0 | 0 | 110 | 21 | 1 | ...do | No | | 9.4 | 8.0 | 17.0 |
| 4 | 27.56 | 0 | 0 | 108 | 17 | 3 | ...do | No | | 9.4 | 8.0 | 16.5 |
| 5 | 27.56 | 5 | 0 | 106 | 19 | 0 | Haze | No | | 9.4 | 8.0 | 16.3 |
| 6 | 27.56 | 5 | 0.5 | 110 | 12 | 0 | Clear | Yes | | 9.4 | 8.0 | 16.7 |
| 7 | 27.56 | 5 | 1.5 | 108 | 14 | 0 | ...do | Yes | | 9.3 | 8.0 | 16.6 |
| 8 | 27.56 | 5 | 2 | 106 | 12 | 0 | ...do | Yes | | 9.2 | 8.0 | 16.7 |
| 9 | 27.56 | 0 | 1.5 | 108 | 12 | 0 | ...do | Yes | | 9.4 | 8.0 | 16.7 |
| 10 | 27.56 | 0 | 0.5 | 108 | 14 | 0 | ...do | No | | 9.3 | 8.0 | 16.7 |
| 11 | 27.56 | 2 | 0.5 | 108 | 13 | 0 | ...do | Yes | | 9.3 | 8.0 | 16.7 |
| 12 | 27.56 | 2 | 1.5 | 108 | 11 | 0 | ...do | Yes | | 9.2 | 8.0 | 17.3 |
| Group II: | | | | | | | | | | | | |
| 13 | 27.16 | 0 | 0 | 104 | 16 | 0 | Sl. Haze | No | | 9.0 | 8.0 | 17.0 |
| 14 | 27.16 | 0 | 0 | 106 | 16 | 0 | ...do | No | | 9.1 | 8.0 | 17.1 |
| 15 | 27.16 | 0 | 0.25 | 105 | 13 | 0 | Clear | Yes | | 9.0 | 8.0 | 17.0 |
| 16 | 27.16 | 0 | 0.5 | 106 | 12 | 0 | ...do | Yes | | 9.0 | 8.0 | 16.9 |
| Group III: 17 | 26.1 | 0 | 0 | 100 | | 0 | ...do | No | | 8.5 | 8.0 | 16.8 |

[1] Acid prepared at 165° F. with 100% theoretical $P_2S_5$ to a minimum sp. gr. of 1.040.
[2] Weight percent on $P_2S_5$.
[3] Weight percent on dialkyl dithiophosphoric acid (DDPA).
[4] Time in minutes to filter 400 grams of ZDDP.
[5] 0.5 wt. percent ZDDP in $H_2S$ test oil.

A comparison of additive preparations 5 through 12 with preparations 1 through 4 in Table I shows that addition of free sulfur prior to neutralization improves H₂S stability and filterability of the additive when added to a mineral lubricating oil. Comparing preparation 5 with preparations 9 and 10 illustrates the fact that improved filterability is obtained when the sulfur is added to the dithiophosphoric acid just prior to neutralization. The Group II additive preparations illustrate the fact that improved H₂S stability is obtained simply by using the preferred low phosphorus content $P_2S_5$. A comparison of preparations 12 and 13 with preparatons 14 and 15 shows, however, that adding free sulfur prior to neutralization of the acid helps to give improved filterability and clarity to the final product. Group III, preparation 17, shows the improved properties obtained with very low-phosphorus-containing phosphorus pentasulfide.

To fully illustrate another advantage in the use of the low phosphorus content $P_2S_5$ (i.e. below 27.6 wt. percent phosphorus) in the process of this invention, a series of zinc dialkyl dithiophosphates were prepared according to the procedure of Example I(a) and preparations 1–4 of Table I (i.e., wherein no free sulfur is added). Table II shows that the lower phosphorus content $P_2S_5$ has the added advantage of requiring less ZnO to neutralize the same quantity of acid.

*Table II*

[Percent P in $P_2S_5$ v. percent theoretical ZnO required to neutralize given quantity of dithiophosphoric acid]

| P, Percent in $P_2S_5$ | ZnO, Percent Theoretical for Neutralizing Acid |
|---|---|
| 26.1 | 100 |
| 27.1 | 104 |
| 27.5 | 106 |
| 27.8 | 110 |
| 28.3 | 115 |

EXAMPLE II

Runs C through G of Table III illustrate the preparation of cadmium dialkyl dithiophosphates according to the preferred process of this invention. Runs A and B show that the high phosphorus products gave a dialkyl dithiophosphoric acid with the proper apparent composition as shown by the S/P ratio, but led to neutralized products having high neutralization numbers (ASTM D–974) and compositions quite far from the theoretical values. Run C shows the use of the process of this invention in which relatively low phosphorus content $P_2S_5$ and elemental sulfur were used. Run C gave a dithiophosphate whose composition corresponded closely to the theoretical and which had an extremely low neutralization number. Runs D–G illustrate the preparation of cadmium dithiophosphates using the preferred low phosphorus content phosphorus pentasulfide of this invention. Runs D–G also illustrate the use of nitrogen blowing to aid in obtaining metal dithiophosphates having low neutralization numbers.

*Table III*

EFFECT OF PHOSPHORUS CONTENT OF $P_2S_5$

[Acid prod: Methyl isobutyl carbinol plus $P_2S_5$ for 3 hours at 190° F. Acid cooled and filtered]

| Run | A | B | C | D | E | F | G |
|---|---|---|---|---|---|---|---|
| Percent P in $P_2S_5$ | 28.3 | 28.3 | 27.5 | 27.2 | 27.2 | 26.1 | 26.0 |
| Acid | (Not blown with N₂) | | | (Blown with N₂⁵) | | | |
| Sulfur, wt. percent | 21.39 | 20.74 | 20.40 | | | | |
| Phosphorus, wt. percent | 10.20 | 10.27 | 9.81 | | | | |
| Ratio S/P ¹ | 2.10 | 2.02 | 2.08 | | | | |
| Percent Free Sulfur Added ² | | | 0.5 | | | | |
| Neutralization: | | | | | | | |
| CdO, Percent Theory | 110 | 110 | 110 | 140 | 120 | 120 | 105 |
| Reaction Time, hrs | 3 | 3 | 3 | 5 | 4 | 4 | 4 |
| Reaction Temp. max. ° F | 210 | 210 | *230 | 204 | 170 | 170 | 150 |
| Product: ³ | | | | | | | |
| Sulfur, wt. percent | 12.43 | 12.79 | 13.70 | 13.7 | 13.1 | 13.7 | 13.1 |
| Phosphorus, wt. percent | 6.77 | 6.74 | 6.47 | 6.5 | 6.5 | 6.5 | 6.2 |
| Cadmium, wt. percent | 9.66 | 10.30 | 11.99 | 11.7 | 11.8 | 11.8 | 11.9 |
| Neut. No. ASTM D–974 | 35.5 | 23.9 | 2.7 | 5.58 | 2.87 | 5.73 | 5.66 |
| Ratio S/P ¹ | 1.84 | 1.90 | 2.12 | 2.11 | 2.02 | 2.11 | 2.11 |
| Ratio Cd/P ⁴ | 1.43 | 1.53 | 1.85 | 1.80 | 1.82 | 1.82 | 1.92 |

*Temperature rose to 230° F., cooled to 185° F. for remainder of reaction.
¹ Theoretical is 2.07.
² Based on weight of dithiophosphoric acid.
³ 75 wt. percent Cadmium DDP in refined coastal distillate having a nominal viscosity at 210° F. of 40 SSU.
⁴ Theoretical is 1.81.
⁵ Acid blown with N₂ for 1 hour.

It should be understood that both nitrogen blowing of the dithiophosphoric acid and addition of elemental sulfur may be employed in the process of the present invention if desired. Where metal dithiophosphates having exceptionally low neutralization numbers are required the combination of treating the acid with free sulfur and nitrogen blowing has been found to be extremely useful.

EXAMPLE III

To illustrate the preparation of lead dithiophosphates by the process of this invention a sample of lead di C₆ (methyl isobutyl carbinol) dialkyl dithiophosphate was prepared by double decomposition according to the following equation:

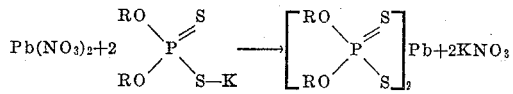

The dialkyl dithiophosphoric acid was prepared by reacting 4 moles of methyl isobutyl carbinol with one mole of phosphorus pentasulfide containing 27.5 wt. percent phosphorus and was neutralized with potassium hydroxide in methanol. When neutralization was complete, the methanol was stripped from the resulting potassium dialkyl dithiophosphate and the product (a white powder) dried. The dried powder was washed by slurrying with hexane and filtered. The washed powder on stirring with an aqueous solution of lead nitrate gave a gummy white precipitate which was filtered, washed with water and dried. The resulting white powder had the following composition:

| | |
|---|---|
| Pb | 25.25 wt. percent. |
| P | 7.95 wt. percent. |
| S | 16.40 wt. percent. |
| S/P | 2.06 (theory, 2.07). |
| Pb/P | 3.18 (theory, 3.34). |
| Neut. No., D–974 | 7.42. |

The lead dialkyl dithiophosphates of this invention can also be prepared by direct neutralization of a dialkyl dithiophosphoric acid prepared from a phosphorus pentasulfide containing less than 27.6 wt. percent phosphorus. For example, 2 moles of the di $C_6$ methyl isobutyl carbinol) dithiophosphoric acid (prepared above) are directly neutralized with one mole of lead oxide according to the procedure of Example I.

EXAMPLE IV

To illustrate the preparation of an alkaline earth metal dithiophosphate by the improved process of this invention, 4 moles of a $C_{12}$ aliphatic alcohol are reacted with 1 mole of a phosphorus pentasulfide containing 27.16 wt. percent phosphorus at 175° F. for 4 hours to form a di $C_{12}$ dithiophosphoric acid. The acid is cooled, filtered and then neutralized by reacting it with ½ mole calcium hydroxide at a temperature of 140° F. for about 6 hours.

What is claimed is:

1. In the preparation of a polyvalent metal salt of a dialkyl dithiophosphoric acid by the reaction of an aliphatic alcohol having in the range of from 1 to 16 carbon atoms per molecule with phosphorus pentasulfide in a mole ratio of about 4 moles of the alcohol per mole of phosphorus pentasulfide to form a dialkyl dithiophosphoric acid and thereafter converting the said acid to an essentially neutral salt of a polyvalent metal selected from the group consisting of the alkaline earth metals, zinc, lead, cadmium, cobalt, copper, and nickel, the improvement which comprises using in the first-named reaction a phosphorus pentasulfide containing less than 27.6 weight percent of phosphorus, and adding to the said dialkyl dithiophosphoric acid, prior to said conversion to said salt, from 0.1 to 3.0 weight percent of free sulfur.

2. The process according to claim 1 wherein said phosphorus pentasulfide contains in the range of 26.0 to 27.2 weight percent phosphorus.

3. Process as defined by claim 1 wherein said salt is prepared by neutralizing said dialkyl dithiophosphoric acid with a basic reactant selected from the group consisting of the oxides and hydroxides of the metals set forth in claim 9.

4. Process as defined by claim 1 wherein said salt is prepared by neutralizing said dialkyl dithiophosphoric acid with an alkali metal hydroxide and thereafter reacting at least two moles of the resulting alkali metal dialkyl dithiophosphate with one mole of a salt of a metal selected from the group set forth in claim 9.

5. Process as defined by claim 1 wherein said aliphatic alcohol has in the range of from 3 to 13 carbon atoms.

6. Process as defined by claim 1 wherein said metal salt is a zinc dialkyl dithiophosphate.

7. Process as defined by claim 1 wherein said metal salt is a lead dialkyl dithiophosphate.

8. Process as defined by claim 1 wherein said metal salt is a cadmium dialkyl dithiophosphate.

9. Process as defined by claim 1 wherein said metal salt is an alkaline earth metal dialkyl dithiophosphate.

References Cited in the file of this patent

UNITED STATES PATENTS 2,932,614   Lynch et al. _____ Apr. 12, 1960